United States Patent
Nazarpoor et al.

(10) Patent No.: US 9,216,409 B2
(45) Date of Patent: Dec. 22, 2015

(54) SYSTEMS AND METHODS FOR ZERO-PGM BINARY CATALYST HAVING CU, MN, AND FE FOR TWC APPLICATIONS

(71) Applicants: Zahra Nazarpoor, Camarillo, CA (US); Stephen J. Golden, Santa Barbara, CA (US)

(72) Inventors: Zahra Nazarpoor, Camarillo, CA (US); Stephen J. Golden, Santa Barbara, CA (US)

(73) Assignee: Clean Diesel Technologies, Inc., Oxnard, CA (US)

( * ) Notice: Subject to any disclaimer, the term of this patent is extended or adjusted under 35 U.S.C. 154(b) by 0 days.

(21) Appl. No.: 14/530,387

(22) Filed: Oct. 31, 2014

(65) Prior Publication Data

US 2015/0105243 A1 Apr. 16, 2015

Related U.S. Application Data (63) Continuation-in-part of application No. 13/849,169, filed on Mar. 22, 2013, now Pat. No. 8,858,903.

(51) Int. Cl.

| | |
|---|---|
| *F01N 3/10* | (2006.01) |
| *F01N 3/20* | (2006.01) |
| *F01N 3/28* | (2006.01) |
| *B01D 53/94* | (2006.01) |
| *B01J 23/889* | (2006.01) |
| *B01J 23/745* | (2006.01) |
| *B01J 23/00* | (2006.01) |

(52) U.S. Cl.
CPC ........... *B01J 23/8892* (2013.01); *B01D 53/945* (2013.01); *B01J 23/005* (2013.01); *B01J 23/745* (2013.01); *B01D 2255/2066* (2013.01); *B01D 2255/20715* (2013.01); *B01D 2255/20738* (2013.01); *B01D 2255/20761* (2013.01); *B01D 2255/405* (2013.01); *B01D 2255/65* (2013.01); *Y02T 10/22* (2013.01); *Y10S 502/52712* (2013.01)

(58) Field of Classification Search
CPC .............. F01N 3/10; F01N 3/20; F01N 3/28; B01D 2255/405; B01D 53/94
See application file for complete search history.

(56) References Cited

U.S. PATENT DOCUMENTS

| | | | | |
|---|---|---|---|---|
| 2014/0336044 A1* | 11/2014 | Nazarpoor | ........... | B01J 23/8892 502/303 |
| 2014/0357475 A1* | 12/2014 | Nazarpoor | ........... | B01J 23/8892 502/73 |

* cited by examiner

*Primary Examiner* — Timothy Vanoy
(74) *Attorney, Agent, or Firm* — Barnes & Thornburg LLP; Edward F. Behm, Jr.; Thomas J. McWilliams (57) ABSTRACT

Variations of bulk powder catalyst material including Cu—Mn, Cu—Fe, and Fe—Mn spinel systems for ZPGM TWC applications are disclosed. The disclosed bulk powder catalyst samples include stoichiometric and non-stoichiometric Cu—Mn, Cu—Fe, and Fe—Mn spinels on $Pr_6O_{11}$—$ZrO_2$ support oxide, prepared using incipient wetness method. Activity measurements under isothermal steady state sweep test condition may be performed under rich to lean condition. Catalytic activity of samples may be compared to analyze the influence that different binary spinel system bulk powders may have on TWC performance of ZPGM materials for a plurality of TWC applications. Stoichiometric Cu—Mn, Cu—Fe, and Fe—Mn spinel systems exhibit higher catalytic activity than non-stoichiometric Cu—Mn, Cu—Fe, and Fe—Mn spinel systems. The influence of prepared Cu—Mn, Cu—Fe, and Fe—Mn spinel systems may lead into cost effective manufacturing solutions for ZPGM TWC systems.

17 Claims, 6 Drawing Sheets

SYSTEMS AND METHODS FOR ZERO-PGM BINARY CATALYST HAVING CU, MN, AND FE FOR TWC APPLICATIONS

CROSS-REFERENCE TO RELATED APPLICATIONS

This application is a continuation-in-part of U.S. patent application Ser. No. 13/849,169, filed Mar. 23, 2013, entitled "Methods for Oxidation and Two-way and Three-way ZPGM Catalyst Systems and Apparatus Comprising Same," now U.S. Pat. No. 8,858,903, issued Oct. 14, 2014, which is incorporated herein by reference as if set forth in its entirety.

BACKGROUND

1. Field of the Disclosure

This disclosure relates generally to catalyst materials, and more particularly, to binary spinel systems for ZPGM catalysts for TWC applications.

2. Background Information

Catalysts can have essential attributes of activity, stability, selectivity, and regenerability in long-term service. These attributes can be related to the physical and chemical properties of the catalyst materials, which in turn can be related to the variable parameters inherent in the method used for the preparation of the catalyst.

Catalysts may include active transition metals that may be added onto a high surface area. By adding multiple metallic components on the surface of a catalyst, the performance of the catalyst can be altered. In particular, bimetallic catalysts may often exhibit improved properties that are not present on either of the single metal catalysts.

Generally, TWC systems may include bimetallic catalysts, which may be based on Platinum group metals (PGMs), including Pt—Rh, Pt—Pd, Pd—Rh, among others. Although these PGM catalysts may be effective for toxic emission control and have been commercialized in industry, PGM materials are expensive. This high cost remains a critical factor for wide spread applications of these catalysts. One possible alternative may be use of Zero-PGM catalysts, which are abundant and less expensive than PGMs.

According to the foregoing reasons, there may be a need to provide material compositions for Zero-PGM catalyst systems for cost effective manufacturing, using a plurality of material compositions for suitable Zero-PGM catalyst, that can be used in a variety of environments and TWC applications.

SUMMARY

The present disclosure may provide material compositions including a plurality of binary spinel compositions on doped Zirconia support oxide to develop suitable ZPGM catalysts for TWC applications.

According to embodiments in present disclosure, catalyst samples may be prepared using variations of Cu—Mn, Cu—Fe, and Fe—Mn stoichiometric and non-stoichiometric spinels on doped Zirconia support oxide, which may be converted into bulk powder format by incipient wetness (IW) method, as known in the art, of spinel systems aqueous solution on doped Zirconia support oxide powder. Stoichiometric and non-stoichiometric binary spinel structures may be prepared at different molar ratios according to general formulation $A_XB_{3-X}O_4$, where X may be variable of different molar ratios within a range from about 0 to about 1.5 and A and B can be Cu, Mn, and Fe. In present disclosure, disclosed Cu—Mn, Cu—Fe, and Fe—Mn spinel systems may be supported on Praseodymium-Zirconia support oxide powders, which may be subsequently dried, calcined, and ground to bulk powder.

The NO/CO cross over R-value of bulk powder catalyst samples, per binary spinel systems in present disclosure, may be determined by performing isothermal steady state sweep test. The isothermal steady state sweep test may be carried out at a selected inlet temperature using an 11-point R-value from rich condition to lean condition at a plurality of space velocities. Results from isothermal steady state sweep test may be compared to show the influence that different binary spinel system bulk powders may have on TWC performance, particularly under rich condition close to stoichiometric condition. Additionally, catalytic performance of bulk powder samples including Cu—Mn, Cu—Fe, and Fe—Mn spinels may be qualitatively compared separately for each group of binary spinel systems. According to principles in present disclosure, the binary spinel system in each group, which shows high level of activity, may be compared with binary spinel systems from other groups also showing high level of activity to analyze influence on TWC performance for overall improvements on catalyst manufacturing.

According to principles in present disclosure, comparison of bulk powder catalyst samples showing the most effective TWC performance may be used for a plurality of TWC applications. Catalyst samples in the other groups which may show significant TWC performance, may also be made available for utilization as bulk powder catalyst materials for the manufacturing of ZPGM catalysts for TWC applications.

Numerous other aspects, features, and benefits of the present disclosure may be made apparent from the following detailed description taken together with the drawing figures, which may illustrate the embodiments of the present disclosure, incorporated herein for reference.

BRIEF DESCRIPTION OF THE DRAWINGS

The present disclosure can be better understood by referring to the following figures. The components in the figures are not necessarily to scale, emphasis instead being place upon illustrating the principles of the disclosure. In the figures, reference numerals designate corresponding parts throughout the different views.

FIG. 1 shows catalyst performance for bulk powder catalyst samples of Cu—Mn spinels on doped Zirconia support oxide, under isothermal steady state sweep condition, at inlet temperature of about 450° C. and space velocity (SV) of about 40,000 h$^{-1}$, according to an embodiment.

FIG. 3 depicts catalyst performance comparison for bulk powder catalyst samples of stoichiometric and non-stoichiometric Cu—Fe spinels on doped Zirconia support oxide, under isothermal steady state sweep condition, at inlet temperature of about 450° C. and SV of about 40,000 h$^{-1}$, according to an embodiment.

FIG. 5 illustrates catalyst performance comparison for bulk powder catalyst samples of stoichiometric and non-stoichiometric Fe—Mn spinels on doped Zirconia support oxide, under isothermal steady state sweep condition, at inlet temperature of about 450° C. and SV of about 40,000 $h^{-1}$, according to an embodiment.

FIG. 6 depicts catalyst performance comparison for bulk powder catalyst samples of stoichiometric Cu—Mn, Cu—Fe and Fe—Mn spinels on doped Zirconia support oxide, under isothermal steady state sweep condition, at inlet temperature of about 450° C. and SV of about 40,000 $h^{-1}$, according to an embodiment.

DETAILED DESCRIPTION

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

DEFINITIONS

As used here, the following terms may have the following definitions:

"Platinum group Metal (PGM)" refers to platinum, palladium, ruthenium, iridium, osmium, and rhodium.

"Zero platinum group (ZPGM) catalyst" refers to a catalyst completely or substantially free of platinum group metals.

"Catalyst" refers to one or more materials that may be of use in the conversion of one or more other materials.

"Incipient wetness (IW)" refers to the process of adding solution of catalytic material to a dry support oxide powder until all pore volume of support oxide is filled out with solution and mixture goes slightly near saturation point.

"Calcination" refers to a thermal treatment process applied to solid materials, in presence of air, to bring about a thermal decomposition, phase transition, or removal of a volatile fraction at temperatures below the melting point of the solid materials.

"Milling" refers to the operation of breaking a solid material into a desired grain or particle size.

"Treating, treated, or treatment" refers to drying, firing, heating, evaporating, calcining, or mixtures thereof.

"Spinel" refers to any of various mineral oxides of magnesium, iron, zinc, or manganese in combination with aluminum, chromium, copper or iron with $AB_2O_4$ structure.

"Conversion" refers to the chemical alteration of at least one material into one or more other materials.

"R-value" refers to the number obtained by dividing the reducing potential by the oxidizing potential of materials in a catalyst.

"Rich condition" refers to exhaust gas condition with an R-value above 1.

"Lean condition" refers to exhaust gas condition with an R-value below 1.

"Air/Fuel ratio" or "A/F ratio" refers to the weight of air divided by the weight of fuel.

"Three-way catalyst (TWC)" refers to a catalyst that may achieve three simultaneous tasks: reduce nitrogen oxides to nitrogen and oxygen, oxidize carbon monoxide to carbon dioxide, and oxidize unburnt hydrocarbons to carbon dioxide and water.

DESCRIPTION OF THE DRAWINGS

The present disclosure may provide bulk powder material compositions including Cu—Mn, Cu—Fe, and Fe—Mn spinels on a plurality of support oxides to develop suitable ZPGM catalyst materials capable of providing high chemical reactivity and thermal stability. Aspects that may be treated in present disclosure may show catalytic conversion capacity or recombination rates of a plurality of binary spinel system bulk powders and the influence on TWC performance.

Bulk Powder ZPGM Catalyst Material Composition and Preparation

The disclosed Zero-PGM material compositions in form of bulk powder in the present disclosure may be prepared from stoichiometric and non-stoichiometric binary spinels of Cu—Mn, Cu—Fe, and Fe—Mn at different molar ratios. All binary spinels may be supported on a plurality of support oxides, in present disclosure preferably on doped Zirconia support oxide, via incipient wetness (IW) method as known in the art.

Preparation of bulk powder catalyst samples may begin by preparing the binary solution for Cu—Mn, Cu—Fe, and Fe—Mn spinels to make aqueous solution. Binary solutions of Cu—Mn, Cu—Fe, and Fe—Mn may be prepared by mixing the appropriate amount of Mn nitrate solution ($Mn(NO_3)_2$), Cu nitrate solution ($CuNO_3$), and Fe nitrate solution ($Fe(NO_3)_3$) with water to make solution at different molar ratios according to general formulations in Table 1, where disclosed binary spinel systems in present disclosure are shown. Accordingly, solution of Cu—Mn, Cu—Fe, and Fe—Mn nitrates may be subsequently added drop-wise to doped Zirconia support oxide powder via IW method. Then, mixtures of Cu—Mn, Cu—Fe, and Fe—Mn binary spinels on doped Zirconia may be dried at 120° C. over night and calcined at a plurality of temperatures. In present disclosure, calcination may be performed at about 800° C. for about 5 hours. Subsequently, calcined materials of Cu—Mn, Cu—Fe, and Fe—Mn binary spinels on doped Zirconia may be ground to fine grain bulk powder.

TABLE 1

| System | Elements | Composition | |
|---|---|---|---|
| Binary | Cu—Mn | $Cu_XMn_{3-X}O_4$ | $1 \leq X \leq 1.5$ |
|  | Cu—Fe | $Cu_XFe_{3-X}O_4$ | $0.5 \leq X \leq 1$ |
|  | Fe—Mn | $Fe_XMn_{3-X}O_4$ | $0 \leq X \leq 1.5$ |

Bulk powder catalyst samples may be then prepared for testing under isothermal steady state sweep condition to determine and analyze TWC performance resulting for each catalyst sample including stoichiometric and non-stoichiometric Cu—Mn, Cu—Fe, Fe—Mn binary spinels on doped Zirconia support oxide.

The NO/CO cross over R-value of bulk powder catalyst samples, per disclosed binary spinels, may be determined by performing isothermal steady state sweep test.

Results from isothermal steady state sweep test may be compared to show the influence that different binary spinel system bulk powders may have on TWC performance, particularly under rich condition close to stoichiometric condition. Additionally, catalytic performance of bulk powder samples including stoichiometric and non-stoichiometric Cu—Mn, Cu—Fe, and Fe—Mn spinels on doped Zirconia support oxide may be qualitatively compared.

According to principles in present disclosure, the binary spinel system in each group, which shows high level of activity, may be compared with binary spinel systems from other groups also showing high level of activity to analyze influence on TWC performance for overall improvements that may be developed in the preparation of bulk powder catalyst material to use for ZPGM catalyst for TWC applications.

Isothermal Steady State Sweep Test Procedure

The isothermal steady state sweep test may be done employing a flow reactor at inlet temperature of about 450° C., and testing a gas stream at 11-point R-values from about 2.0 (rich condition) to about 0.8 (lean condition) to measure the CO, NO, and HC conversions. In present disclosure, gas stream may be tested at R-values from about 1.6 (rich condition) to about 0.9 (lean condition) to measure the CO, NO, and HC conversions.

The space velocity (SV) in the isothermal steady state sweep test may be adjusted at about 40,000 $h^{-1}$. The gas feed employed for the test may be a standard TWC gas composition, with variable $O_2$ concentration in order to adjust R-value from rich condition to lean condition during testing. The standard TWC gas composition may include about 8,000 ppm of CO, about 400 ppm of $C_3H_6$, about 100 ppm of $C_3H_8$, about 1,000 ppm of $NO_X$, about 2,000 ppm of $H_2$, about 10% of $CO_2$, and about 10% of $H_2O$. The quantity of $O_2$ in the gas mix may be varied to adjust Air/Fuel (A/F) ratio within the range of R-values to test the gas stream.

The following examples are intended to illustrate the scope of the disclosure. It is to be understood that other procedures known to those skilled in the art may alternatively be used.

EXAMPLES

Example #1

Stoichiometric and Non-Stoichiometric Cu—Mn Spinels on $Pr_6O_{11}$—$ZrO_2$ Support Oxide Example #1 may illustrate preparation of bulk powder catalyst samples from stoichiometric and non-stoichiometric Cu—Mn spinels supported on $Pr_6O_{11}$—$ZrO_2$ support oxide via IW method with general formulation of $Cu_XMn_{3-X}O_4$ where $1.0 \leq X \leq 1.5$.

Preparation of bulk powder catalyst samples may begin by preparing the Cu—Mn solution by mixing the appropriate amount of Cu nitrate solution ($CuNO_3$) and Mn nitrate solution ($Mn(NO_3)_2$) with water to make solution at different molar ratios according to formulation in Table 2, where disclosed stoichiometric and non-stoichiometric Cu—Mn spinel systems are shown. Then, solution of Cu—Mn nitrates may be added drop-wise to $Pr_6O_{11}$—$ZrO_2$ support oxide powder via IW method. Subsequently, mixture of Cu—Mn spinel on $Pr_6O_{11}$—$ZrO_2$ support oxide may be dried at 120° C. over night and calcined at about 800° C. for 5 hours, and then ground to fine grain bulk powder.

TABLE 2

| Binary spinel | Composition |
|---|---|
| Cu—Mn | $CuMn_2O_4$ |
| | $Cu_{1.5}Mn_{1.5}O_4$ |

In example #1, the performance of bulk powder catalyst samples may be determined by performing isothermal steady state sweep test at about 450° C., and testing a gas stream at R-values from about 2.0 (rich condition) to about 0.8 (lean condition) to measure the CO, NO, and HC conversions. SV in the isothermal steady state sweep test may be adjusted at about 40,000 $h^{-1}$. In present disclosure, NO conversion, CO conversion, and HC conversion from prepared bulk powder samples of stoichiometric and non-stoichiometric Cu—Mn spinels may be measured/analyzed from about 1.6 (rich condition) to about 0.9 (lean condition).

FIG. 1 shows catalyst performance 100 for bulk powder catalyst samples prepared per example #1, under isothermal steady state sweep condition, at inlet temperature of about 450° C. and SV of about 40,000 $h^{-1}$, according to an embodiment.

Figure 1A:
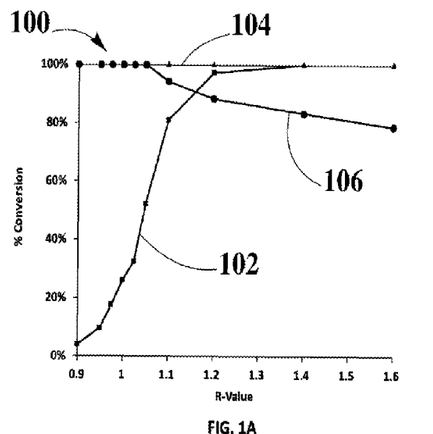
FIG. 1A shows TWC activity for stoichiometric Cu—Mn spinel on doped Zirconia support oxide.

In FIG. 1A, conversion curve 102 (solid line with square), conversion curve 104 (solid line with triangle), and conversion curve 106 (solid line with circle) respectively show isothermal steady state sweep test results for NO conversion, CO conversion, and HC conversion for bulk powder catalyst samples including stoichiometric $Cu_{1.0}Mn_{2.0}O_4$ spinel.

As may be seen in FIG. 1A, for bulk powder catalyst samples including stoichiometric $Cu_{1.0}Mn_{2.0}O_4$ spinel, NO/CO cross over R-value takes place at the specific R-value of 1.4, where $NO_X$ and CO conversions are about 100%, respectively. Activity for bulk powder catalyst samples including stoichiometric $Cu_{1.0}Mn_{2.0}O_4$ spinel may be observed at R-value of 1.1. At this R-value, HC and $NO_X$ conversions are about 94.3% and 81.1%, respectively. CO conversion is 100% at entire R-value region.

Figure 1B:
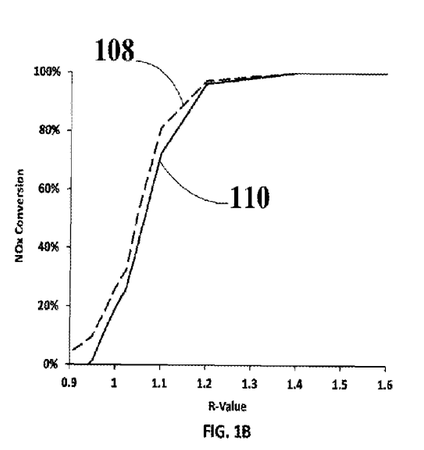
FIG. 1B depicts comparison of NO$_X$ conversion levels for stoichiometric and non-stoichiometric Cu—Mn spinels on doped Zirconia support oxide.

In FIG. 1B, conversion curve 108 (long dash line) and conversion curve 110 (solid line) respectively show steady state sweep test results for NO conversion comparison for bulk powder catalyst samples including $Cu_{1.0}Mn_{2.0}O_4$ and $Cu_{1.5}Mn_{1.5}O_4$ spinels. As may be seen, comparison of results of $NO_X$ conversion indicates that bulk powder catalyst samples including stoichiometric $Cu_{1.0}Mn_{2.0}O_4$ spinel show higher catalytic activity than bulk powder catalyst samples including non-stoichiometric $Cu_{1.5}Mn_{1.5}O_4$ spinel.

Example #2

Stoichiometric and Non-Stoichiometric Cu—Fe Spinels on $Pr_6O_{11}$—$ZrO_2$ Support Oxide Example #2 may illustrate preparation of bulk powder catalyst samples from stoichiometric and non-stoichiometric Cu—Fe spinels supported on $Pr_6O_{11}$—$ZrO_2$ support oxide via IW method with general formulation of $Cu_XFe_{3-X}O_4$ where $0.5 \leq X \leq 1.0$.

Preparation of bulk powder catalyst samples may begin by preparing the Cu—Fe solution by mixing the appropriate amount of Cu nitrate solution ($CuNO_3$) and Fe nitrate solution ($Fe(NO_3)_3$) with water to make solution at different molar ratios according to formulation in Table 3, where disclosed stoichiometric and non-stoichiometric Cu—Fe spinel systems are shown. Then, solution of Cu—Fe nitrates may be added drop-wise to $Pr_6O_{11}$—$ZrO_2$ support oxide powder via IW method. Subsequently, mixture of Cu—Fe spinel on $Pr_6O_{11}$—$ZrO_2$ support oxide may be dried at 120° C. over night and calcined at about 800° C. for 5 hours, and then ground to fine grain bulk powder.

TABLE 3

| Binary spinel | Composition |
|---|---|
| Cu—Fe | $CuFe_2O_4$ |
|  | $Cu_{1.5}Fe_{1.5}O_4$ |
|  | $Cu_{0.5}Fe_{2.5}O_4$ |

In example #2, the performance of bulk powder catalyst samples may be determined by performing isothermal steady state sweep test at about 450° C., and testing a gas stream at R-values from about 2.0 (rich condition) to about 0.8 (lean condition) to measure the CO, NO, and HC conversions. SV in the isothermal steady state sweep test may be adjusted at about 40,000 $h^{-1}$. In present disclosure, NO conversion, CO conversion, and HC conversion from prepared bulk powder samples of stoichiometric and non-stoichiometric Cu—Fe spinels may be measured/analyzed from about 1.6 (rich condition) to about 0.9 (lean condition).

Figure 2:
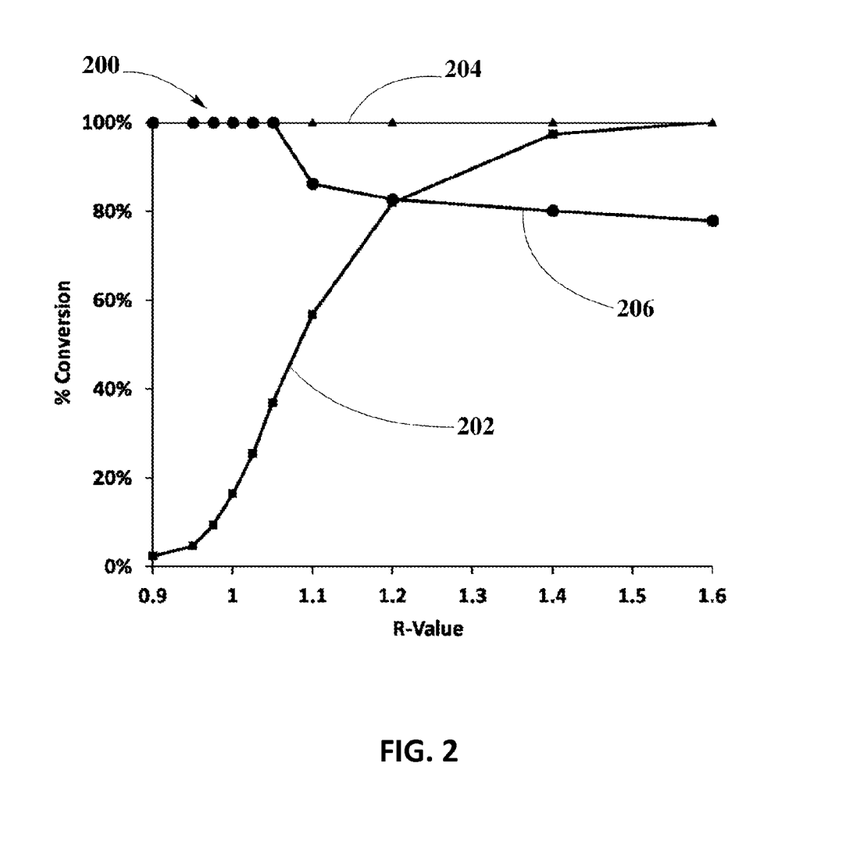
FIG. 2 illustrates catalyst performance for bulk powder catalyst samples of stoichiometric Cu—Fe spinel on doped Zirconia support oxide, under isothermal steady state sweep condition, at inlet temperature of about 450° C. and SV of about 40,000 h$^{-1}$, according to an embodiment.

FIG. 2 illustrates catalyst performance 200 for bulk powder catalyst samples prepared per example #2, under isothermal steady state sweep condition, at inlet temperature of about 450° C. and SV of about 40,000 $h^{-1}$, according to an embodiment.

In FIG. 2, conversion curve 202 (solid line with square), conversion curve 204 (solid line with triangle), and conversion curve 206 (line with solid circle) respectively illustrate isothermal steady state sweep test results for NO conversion, CO conversion, and HC conversion for bulk powder catalyst samples including stoichiometric $Cu_{1.0}Fe_{2.0}O_4$ spinel.

As may be seen in FIG. 2, for bulk powder catalyst samples including stoichiometric $Cu_{1.0}Fe_{2.0}O_4$ spinel, NO/CO cross over R-value takes place at the specific R-value of 1.60, where $NO_X$ and CO conversions are about 100%, respectively. Activity for bulk powder catalyst samples including stoichiometric $Cu_{1.0}Fe_{2.0}O_4$ spinel may be observed at R-value of 1.1. At this R-value, HC and $NO_X$ conversions are about 86.2% and about 56.8%, respectively. CO conversion is 100% at entire R-value region.

FIG. 3 depicts catalyst performance comparison 300 for bulk powder catalyst samples per example #2, under isothermal steady state sweep condition, at inlet temperature of about 450° C. and SV of about 40,000 $h^{-1}$, according to an embodiment.

Figure 3A:
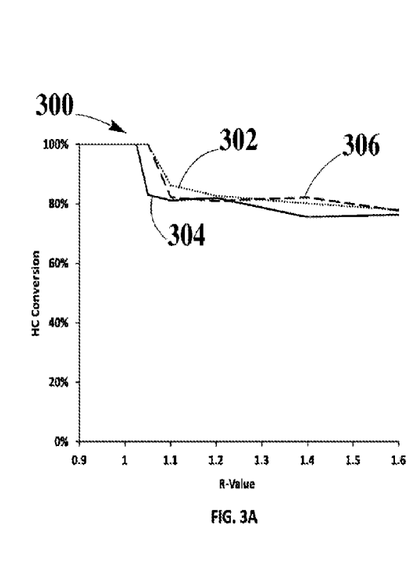
FIG. 3A shows comparison of HC conversion levels for stoichiometric and non-stoichiometric Cu—Fe spinels on doped Zirconia support oxide.

In FIG. 3A, conversion curve 302 (dot line), conversion curve 304 (solid line), and conversion curve 306 (long dash line) respectively depict steady state sweep test results for HC conversion comparison for bulk powder catalyst samples including $Cu_{1.0}Fe_{2.0}O_4$, $Cu_{1.5}Fe_{1.5}O_4$, and $Cu_{0.5}Fe_{2.5}O_4$ spinels. As may be seen, comparison of results of HC conversion indicates that bulk powder catalyst samples including stoichiometric $Cu_{1.0}Fe_{2.0}O_4$ spinel show higher HC conversion than bulk powder catalyst samples including non-stoichiometric $Cu_{1.5}Fe_{1.5}O_4$ and $Cu_{0.5}Fe_{2.5}O_4$ spinels under lean and rich condition.

Figure 3B:
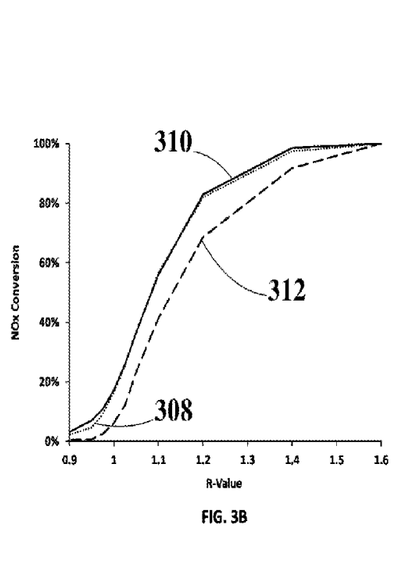
FIG. 3B illustrates comparison of $NO_X$ conversion levels for stoichiometric and non-stoichiometric Cu—Fe spinels on doped Zirconia support oxide.

In FIG. 3B, conversion curve 308 (dot line), conversion curve 310 (solid line), and conversion curve 312 (long dash line) respectively depict steady state sweep test results for NO conversion comparison for bulk powder catalyst samples including $Cu_{1.0}Fe_{2.0}O_4$, $Cu_{1.5}Fe_{1.5}O_4$, and $Cu_{0.5}Fe_{2.5}O_4$ spinels. A comparison of results of $NO_X$ conversion for bulk powder catalyst samples including $Cu_{1.0}Fe_{2.0}O_4$, $Cu_{1.5}Fe_{1.5}O_4$, and $Cu_{0.5}Fe_{2.5}O_4$ spinels indicates that decreasing Cu concentration in the spinel structure to X<1.0 may reduce $NO_X$ conversion as may be seen in FIG. 3B with significant lower $NO_X$ conversion for $Cu_{0.5}Fe_{2.5}O_4$.

Example #3

Stoichiometric and Non-Stoichiometric Fe—Mn Spinels on $Pr_6O_{11}$—$ZrO_2$ Support Oxide Example #3 may illustrate preparation of bulk powder catalyst samples from stoichiometric and non-stoichiometric Fe—Mn spinels supported on $Pr_6O_{11}$—$ZrO_2$ support oxide via IW method with general formulation of $Fe_XMn_{3-X}O_4$ where $0 \leq X \leq 1.5$.

Preparation of bulk powder catalyst samples may begin by preparing the Fe—Mn solution by mixing the appropriate amount of Fe nitrate solution ($Fe(NO_3)_3$) and Mn nitrate solution ($Mn(NO_3)_2$) with water to make solution at different molar ratios according to formulation in Table 4, where disclosed stoichiometric and non-stoichiometric Fe—Mn spinel systems are shown. Then, solution of Fe—Mn nitrates may be added drop-wise to $Pr_6O_{11}$—$ZrO_2$ support oxide powder via IW method. Subsequently, mixture of Fe—Mn spinel on $Pr_6O_{11}$—$ZrO_2$ support oxide may be dried at 120° C. over night and calcined at about 800° C. for 5 hours, and then ground to fine grain bulk powder.

TABLE 4

| Binary spinel | Composition |
|---|---|
| Fe—Mn | $FeMn_2O_4$ |
|  | $Fe_{0.5}Mn_{2.4}O_4$ |
|  | $Fe_{1.2}Mn_{1.8}O_4$ |
|  | $Mn_3O_4$ |

In example #3, the performance of bulk powder catalyst samples may be determined by performing isothermal steady state sweep test at about 450° C., and testing a gas stream at R-values from about 2.0 (rich condition) to about 0.8 (lean condition) to measure the CO, NO, and HC conversions. SV in the isothermal steady state sweep test may be adjusted at about 40,000 $h^{-1}$. In present disclosure, NO conversion, CO conversion, and HC conversion from prepared bulk powder samples of stoichiometric and non-stoichiometric Fe—Mn spinels may be measured/analyzed from about 1.6 (rich condition) to about 0.9 (lean condition).

Figure 4:
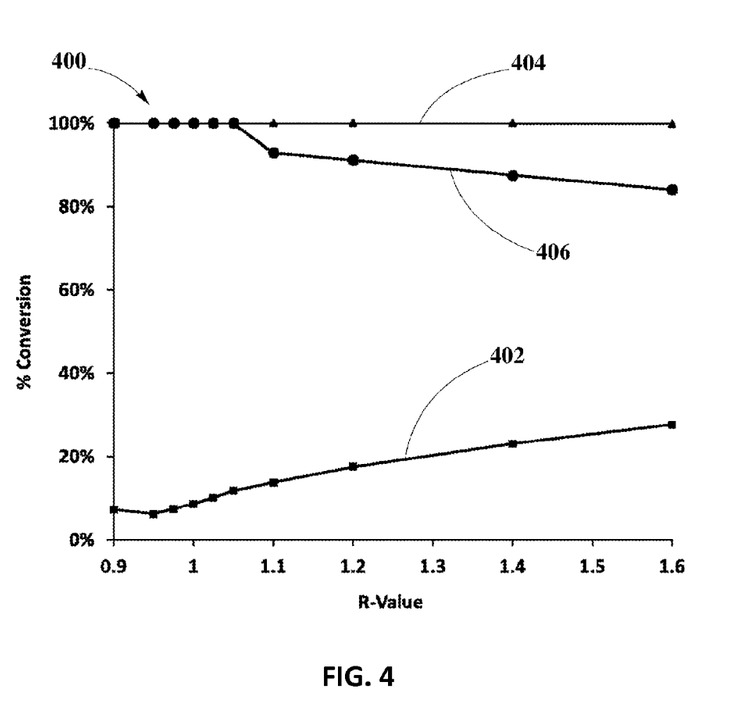
FIG. 4 shows catalyst performance for bulk powder catalyst samples of stoichiometric Fe—Mn spinel on doped Zirconia support oxide, under isothermal steady state sweep condition, at inlet temperature of about 450° C. and SV of about 40,000 $h^{-1}$, according to an embodiment.

FIG. 4 shows catalyst performance 400 for bulk powder catalyst samples prepared per example #3, under isothermal steady state sweep condition, at inlet temperature of about 450° C. and SV of about 40,000 $h^{-1}$, according to an embodiment.

In FIG. 4, conversion curve 402 (solid line with square), conversion curve 404 (solid line with triangle), and conversion curve 406 (solid line with circle) respectively show isothermal steady state sweep test results for NO conversion, CO conversion, and HC conversion for bulk powder catalyst samples including stoichiometric $Fe_{1.0}Mn_{2.0}O_4$ spinel.

As may be seen in FIG. 4, for bulk powder catalyst samples including stoichiometric $Fe_{1.0}Mn_{2.0}O_4$ spinel, NO/CO cross over R-value does not occur. Activity for bulk powder catalyst samples including stoichiometric $Fe_{1.0}Mn_{2.0}O_4$ spinel may be observed at R-value of 1.1. At this R-value, HC and $NO_X$ conversions are about 92.9% and 13.8%, respectively. CO conversion is 100% at entire R-value region. It may be also noted that lower $NO_X$ conversion may be due to the absence of Cu in the spinel structure.

FIG. 5 illustrate catalyst performance comparison 500 for bulk powder catalyst samples per example #3, under isothermal steady state sweep condition, at inlet temperature of about 450° C. and SV of about 40,000 $h^{-1}$, according to an embodiment.

Figure 5A:
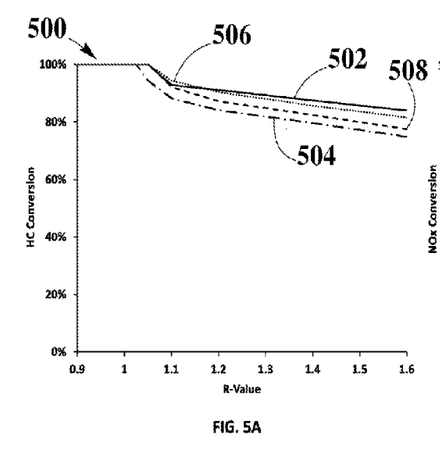
FIG. 5A shows comparison of HC conversion levels for stoichiometric and non-stoichiometric Fe—Mn spinels on doped Zirconia support oxide.

In FIG. 5A, conversion curve 502 (solid line), conversion curve 504 (long dash dot line), conversion curve 506 (dot line), and conversion curve 508 (dash line) respectively illustrate isothermal steady state sweep test results for HC conversion comparison for bulk powder catalyst samples including $Fe_{1.0}Mn_{2.0}O_4$, $Fe_{0.6}Mn_{2.4}O_4$, $Fe_{1.2}Mn_{1.8}O_4$, and $Mn_3O_4$ spinels.

As may be seen in FIG. 5A, bulk powder catalyst samples including stoichiometric $Fe_{1.0}Mn_{2.0}O_4$ spinel may show higher catalytic activity in HC conversion than bulk powder catalyst samples including non-stoichiometric $Fe_{0.6}Mn_{2.4}O_4$, $Fe_{1.2}Mn_{1.8}O_4$, and $Mn_3O_4$ spinels.

Figure 5B:
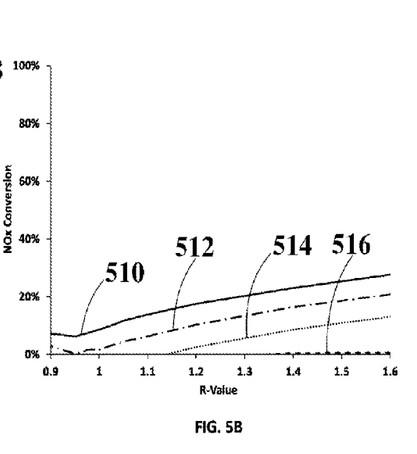
FIG. 5B illustrates comparison of $NO_X$ conversion levels for stoichiometric and non-stoichiometric Fe—Mn spinels on doped Zirconia support oxide.

In FIG. 5B, conversion curve 510 (solid line), conversion curve 512 (long dash dot line), conversion curve 514 (dot line), and conversion curve 516 (dash line) respectively depict isothermal steady state sweep test results for NO conversion comparison for bulk powder samples including $Fe_{1.0}Mn_{2.0}O_4$, $Fe_{0.6}Mn_{2.4}O_4$, $Fe_{1.2}Mn_{1.8}O_4$, and $Mn_3O_4$ spinels.

As may be seen in FIG. 5B, bulk powder catalyst samples including stoichiometric and non-stoichiometric Fe—Mn spinel systems may show in overall low $NO_X$ activity. Additionally, no $NO_X$ conversion occurs when Fe is zero as shown in conversion curve 516, which corresponds to $Mn_3O_4$ spinel. By increasing Fe content, $NO_X$ conversion improves.

Results observed for $NO_X$ and HC conversions indicate that bulk powder catalyst samples including stoichiometric $Fe_{1.0}Mn_{2.0}O_4$ spinel show higher catalytic activity than bulk powder catalyst samples including non-stoichiometric $Fe_{0.6}Mn_{2.4}O_4$, $Fe_{1.2}Mn_{1.8}O_4$, and $Mn_3O_4$ spinels. Additionally, bulk powder catalyst materials including stoichiometric and non-stoichiometric Fe—Mn spinel systems may be employed as oxidation catalyst materials for HC/CO activity since low $NO_X$ activity may be observed.

Comparison of Stoichiometric Cu—Mn, Cu—Fe, and Fe—Mn Spinels on $Pr_6O_{11}$—$ZrO_2$ Support Oxide FIG. 6 depicts catalyst performance comparison 600 for bulk powder catalyst samples of stoichiometric Cu—Mn, Cu—Fe and Fe—Mn spinels supported on $ZrO_2$—$Pr_6O_{11}$, under isothermal steady state sweep condition, at inlet temperature of about 450° C. and SV of about 40,000 $h^{-1}$, according to an embodiment.

Figure 6A:
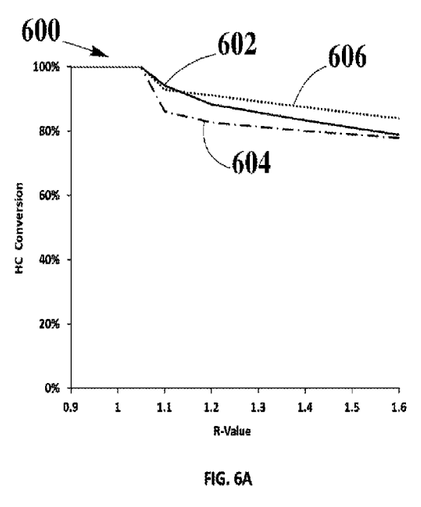
FIG. 6A shows comparison of HC conversion levels for stoichiometric Cu—Mn, Cu—Fe and Fe—Mn spinels on doped Zirconia support oxide.

In FIG. 6A, conversion curve 602 (solid line), conversion curve 604 (long dash dot line), and conversion curve 606 (dot line) respectively show isothermal steady state sweep test results for HC conversion comparison for bulk powder catalyst samples including stoichiometric $Cu_{1.0}Mn_{2.0}O_4$, $Cu_{1.0}Fe_{2.0}O_4$, and $Fe_{1.0}Mn_2O_4$ spinels.

As may be seen in FIG. 6A, bulk powder catalyst samples including stoichiometric $Fe_{1.0}Mn_{2.0}O_4$ spinels show highest catalytic activity in HC conversion than bulk powder catalyst samples including stoichiometric $Cu_{1.0}Mn_{2.0}O_4$ and $Cu_{1.0}Fe_{2.0}O_4$ spinels, while $Cu_{1.0}Fe_{2.0}O_4$ spinel shows lowest HC conversion. CO conversion is 100% for all samples under entire R-value region.

Figure 6B:
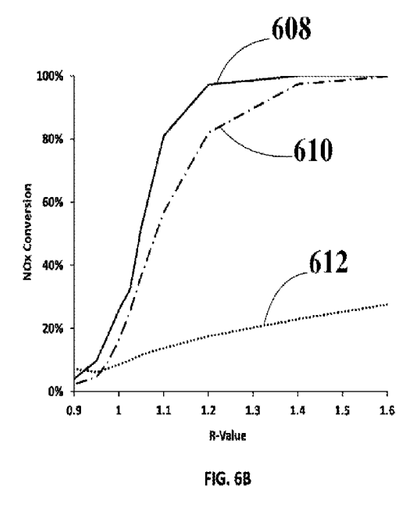
FIG. 6B illustrates comparison of $NO_X$ conversion levels for stoichiometric Cu—Mn, Cu—Fe and Fe—Mn spinels on doped Zirconia support oxide.

In FIG. 6B, conversion curve 608 (solid line), conversion curve 610 (long dash dot line), and conversion curve 612 (dot line) respectively illustrate isothermal steady state sweep test results for NO conversion comparison for bulk powder samples including stoichiometric $Cu_{1.0}Mn_{2.0}O_4$, $Cu_{1.0}Fe_{2.0}O_4$, and $Fe_{1.0}Mn_{2.0}O_4$ spinels.

As may be seen in FIG. 6B, bulk powder catalyst samples including stoichiometric $Cu_{1.0}Mn_{2.0}O_4$ show highest catalytic performance in $NO_X$ conversion than bulk powder catalyst samples including stoichiometric $Cu_{1.0}Fe_2O_4$ and $Fe_{1.0}Mn_2O_4$ spinels, while $Fe_{1.0}Mn_{2.0}O_4$ spinel shows lowest $NO_X$ conversion, thus indicating the presence of Cu as key element for improvement of $NO_X$ conversion.

In present disclosure, all stoichiometric Cu—Mn, Cu—Fe, and Fe—Mn spinel systems show higher activity than non-stoichiometric Cu—Mn, Cu—Fe, and Fe—Mn spinel systems. As may be observed, stoichiometric and non-stoichiometric binary spinel systems not including Cu may show low or no $NO_X$ activity. Cu may be the main element influencing $NO_X$ conversion. Additionally, bulk powder catalyst material including $Mn_3O_4$ oxide may show no influence in $NO_X$ conversion when not in composition with another non-PGM material. Bulk powder catalyst materials including stoichiometric and non-stoichiometric Fe—Mn spinel systems may be employed as oxidation catalyst materials for HC/CO activity. Also, bulk powder catalyst samples including stoichiometric Cu—Mn spinel system exhibits higher $NO_X$ conversion than bulk powder catalyst samples including stoichiometric Cu—Fe spinel system, which shows $NO_X$ conversion level higher than bulk powder catalyst samples including stoichiometric Fe—Mn spinel system. It may also be noted in present disclosure that CO conversion is about 100% for all disclosed stoichiometric and non-stoichiometric binary spinel systems.

Bulk powder catalyst samples including stoichiometric and non-stoichiometric Cu—Mn, Cu—Fe, and Fe—Mn spinel systems on $Pr_6O_{11}$—$ZrO_2$ support oxide powder may exhibit suitable TWC performance when employed in ZPGM catalysts for a plurality of TWC applications, leading to a more effective utilization of ZPGM catalyst materials in TWC converters.

While various aspects and embodiments have been disclosed, other aspects and embodiments may be contemplated. The various aspects and embodiments disclosed here are for purposes of illustration and are not intended to be limiting, with the true scope and spirit being indicated by the following claims.

What is claimed is:

1. A catalytic system, comprising:
a substrate;
a washcoat applied to said substrate; and
an overcoat applied to said washcoat comprising at least one support oxide and at least two catalysts applied to the at least one support oxide;
wherein the at least two catalysts have the general formula $A_XB_{3-X}O_4$, wherein X may be less than or equal to 1.5 and wherein A and B are selected from the group consisting of Cu, Mn, and Fe; and
wherein the at least two catalysts are substantially free of platinum group metals.

2. The catalytic system of claim 1, wherein at least one of the at least two catalysts are in spinel form.

3. The catalytic system of claim 1, wherein at least one of the at least two catalysts are stoichiometric.

4. The catalytic system of claim 1, wherein at least one of the at least two catalysts are non-stoichiometric.

5. The catalytic system of claim 1, wherein the at least one support oxide comprises doped Zirconia.

6. The catalytic system of claim 1, wherein the at least one support oxide comprises $Pr_6O_{11}$—$ZrO_2$.

7. The catalytic system of claim 1, wherein one of the at least two catalysts has the general formula $Cu_xMn_{3-x}O_4$ where $1.0 \leq X \leq 1.5$, and wherein one of the at least two catalysts has the general formula $Cu_xFe_{3-x}O_4$ where $0.5 \leq X \leq 1.0$.

8. The catalytic system of claim 7, further comprising a third catalyst having the general formula $Fe_xMn_{3-x}O_4$ wherein $0 \leq X \leq 1.5$.

9. The catalytic system of claim 1, wherein each of the at least two catalysts is stoichiometric or non-stoichiometric.

10. The catalytic system of claim 1, wherein the conversion of $NO_X$ is higher for stoichiometric spinel than for non-stoichiometric spinel.

11. The catalytic system of claim 1, wherein the conversion of $NO_X$ is higher for stoichiometric spinel having a formula of $Cu_{1.0}Mn_{2.0}O_4$ than for non-stoichiometric spinel having a formula of $Cu_{1.5}Mn_{1.5}O_4$.

12. The catalytic system of claim 1, wherein the conversion of HC is higher for stoichiometric spinel having a formula of $Cu_{1.0}Fe_{2.0}O_4$ than for non-stoichiometric spinel having a formula of $Cu_{1.5}Fe_{1.5}O_4$.

13. The catalytic system of claim 1, wherein the conversion of HC is higher for stoichiometric spinel having a formula of $Cu_{1.0}Fe_{2.0}O_4$ than for non-stoichiometric spinel having a formula of $Cu_{0.5}Fe_{2.5}O_4$.

14. The catalytic system of claim 1, wherein the conversion of HC is higher for stoichiometric spinel having a formula of $Fe_{1.0}Mn_{2.0}O_4$ than for non-stoichiometric spinel having a formula selected from the group consisting of $Fe_{0.6}Mn_{2.4}O_4$, $Fe_{1.2}Mn_{1.8}O_4$, $Mn_3O_4$, and mixtures thereof.

15. The catalytic system of claim 1, wherein an increase in the amount of Fe provides for an increase in the conversion of $NO_X$.

16. The catalytic system of claim 1, wherein at least one of the at least two catalysts is Fe—Mn spinel and wherein the at least two catalysts provide for oxidation activity.

17. The catalytic system of claim 1, wherein the substrate comprises ceramics.

\* \* \* \* \*